United States Patent Office 3,403,258
Patented Sept. 24, 1968

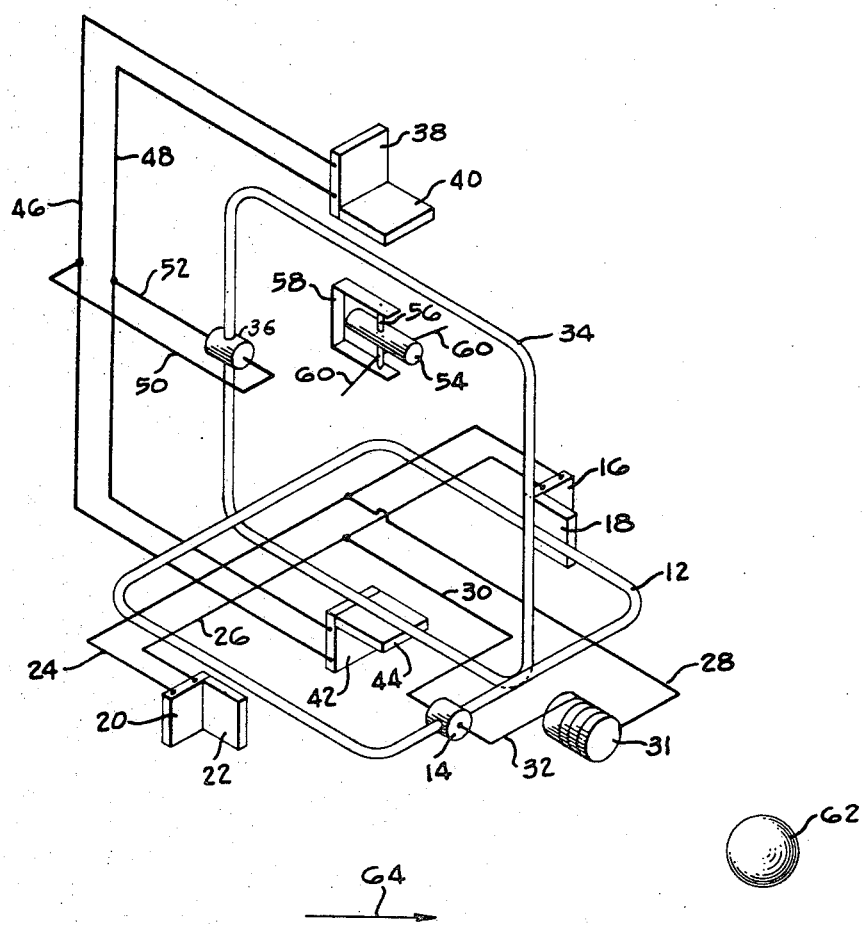

3,403,258
SUN POINTING ATTITUDE CONTROL SYSTEM EMPLOYING FLUID FLYWHEELS WITH NOVEL MOMENTUM UNLOADING MEANS
Louis K. Davis, Audubon, Pa., assignor to General Electric Company, a corporation of New York
Filed Nov. 22, 1965, Ser. No. 509,077
5 Claims. (Cl. 250—203)

This invention pertains to the art of stabilizing space vehicles and more particularly to that portion of the art which pertains to stabilizing such a vehicle with respect to the Sun, when the vehicle is moving in an ambient magnetic field.

In my copending application entitled, "Oscillation Damping System," Ser. No. 376,119, filed June 18, 1964, now Patent No. 3,226,062, I disclose the use on a space vehicle of radiant energy conversion means which, being selectively exposed to solar radiation as the vehicle is displaced around a first axis from its desired orientation with respect to the Sun, cause the operation of a flywheel in such direction as to negate such displacement. I further disclose the use of what are colloquially known in the art as "solar paddles" to unload from the vehicle the angular momentum stored in the flywheel. In order to achieve stabilization of the vehicle around a plurality of axes, a plurality of such devices may be used.

The use of solar paddles for the purpose of unloading momentum, while preferably feasible, has the design limitation that the surface areas required are rather large, and require a large structure, which may have various practical inconveniences. The ambient magnetic field of e.g., the earth is capable of providing useful torques by interaction with e.g., permanent magnets or excited solenoidal windings, which may have high-permeability cores. A stabilization device embodying a fixed parament magnet and a solenoid excited by selectively illuminated solar cells can provide stabilization which is, however, limited to certain selected orbits around, e.g., the earth. Such a device has been invented by Messrs. Kligermann, Seawell, and Savides, while employed by the assignee of this application, and I expressly disclaim having made their invention. A general disadvantage of the use of simple magnetic torquing devices, whether or not selectively controlled, is that if the gradient of the ambient magnetic field is comparatively small (as in fact it is in the vicinity of the earth) it is possible to obtain torques tending to align a particular axis of the vehicle with the local magnetic field; but it is not possible in general to obtain torques that require magnetic poles to bear forces at right angles to the local magnetic field. Thus if a vehicle is, for example, moving in an equatorial orbit so that its pitch axis is approximately aligned with the ambient magnetic field (assumed to run north and south) it is possible to control yaw and rolling by magnetic means, and flywheels used to absorb sudden angular impulses around the yaw and roll axes may be unloaded directly by such magnetic means. But it is not possible by such means to control rotation about the pitch axis; a flywheel used to absorb angular impulses about the pitch axis could not be unloaded directly by magnetic means.

I have invented a device employing two selectively controlled angular momentum storage means such as flywheels, a permanent magnet free to rotate over a semicircle (with respect to the vehicle), and a controllable magnet (such as a solenoid, which may have a high-permeability core) controlled in excitation in similar manner as one of the flywheels. This combination, as described in detail hereinafter, as a result of gyroscope interactions caused by rotation of the flywheels and the vehicle, permits the transfer or conversion of angular momentum around one axis to angular momentum around another axis, from which it can be unloaded against the torque provided by the ambient magnetic field .

Thus the general object I achieve is the attitude stabilization of the freely rotatable body (which may be a Sun-pointing vehicle) with respect to a source of radiant energy and an ambient force field (which may be the Sun and the Earth's magnetic field) around three axes, employing only two flywheels, and without the use (in the case of a space vehicle) of solar paddles which, in practice, must usually be large and therefore require special apparatus to extend them after the vehicle has been sent into space. Achievement of this general object naturally results in greater compactness and simplicity with consequent improved reliability and economy of design. Various other advantages are logically deducible therefrom.

For the better understanding and explanation of my invention I have provided a figure of drawing which represents schematically an isometric view of a stabilization system according to my invention.

Referring to the figure, a conduit containing a dense fluid concealed by the conduit forming, together, a fluid flywheel 12, is connected for circulation of the fluid therethrough by the operation of a reversible pump 14. Such a combination is a conventional fluid flywheel-pump combination. It is common to employ mercury as the dense fluid and to employ a magnetohydrodynamic pump as the reversible pump, the direction of pumping, and thus the direction of circulation of the fluid, being determined by the direction of current flow through the pump. A battery 16 of solar cells is provided with a shade 18 at one side, and a battery 20 of solar cells is similarly provided with a shade 22. The two batteries 16 and 20 and their respective shades 18 and 22 are so oriented that illumination from the lower left of the figure will illuminate battery 20 more than battery 16, and illumination from the upper right of the figure will illuminate battery 16 more than battery 20; illumination from the lower right will illuminate both batteries equally. Negative terminal of battery 16 is connected to positive terminal of battery 20 by conductor 24, and positive terminal of battery 16 is connected to negative terminal of battery 20 by conductor 26. The common conductors 24 and 26 are connected by conductors 28 and 30, respectively, to solenoid 31 and pump 14, the series connection between the two being completed by conductor 32. It will be observed that the axis of solenoid 31 lies in the plane of flywheel 12. (The term "plane" is used here because it is convenient; actually, it is intended to describe any plane normal to the axis around which the flywheel stores angular momentum.) A second conduit forming a part of a fluid flywheel 34 similar to 12 is represented at right angles to the plane of 12, and is so oriented that the plane of flywheel 34 includes the axis of solenoid 31. A reversible pump 36 is included in the hydraulic circuit of flywheel 34 precisely as pump 14 is included in the hydraulic circuit of flywheel 12. In further analogy to the system associated with flywheel 12 there is provided for flywheel 34 a solar battery 38 having a shade 40 and a solar battery 42 having shade 44. Oppositely poled terminals of solar batteries 38 and 42 are connected together by conductors 46 and 48 precisely as oppositely poled terminals of solar batteries 16 and 18 are connected together by conductors 20 and 22. The common conductors 46 and 48 are connected by conductors 50 and 52 to the terminals of reversible pump 36. It may thus be seen that there is a substantially complete analogy between the flywheel 12 and its associated systems and the flywheel 34 and its associated systems with the exception that flywheel 12 has in its electrical circuit solenoid 31 while flywheel 34 is not provided with any kind of solenoid in circuit with its pump. Last major element in the device is a bar magnet 54 supported on a pivot shaft 56 which is in turn mounted on bearing yoke 58. An elongated member 60, which may be a stiff wire, is represented as piercing the pivot shaft 56 and extending on both sides approximately at right angles to the bar magnet 54. Actually, as the drawing indicates, member 60 is not quite straight, but is bent slightly, because its function is to serve as a stop to prevent the bar magnet 54 from rotating through more than 180 degrees; and, since the base of the yoke 58 is of finite thickness, it is necessary that the two halves of stop 60 be bent slightly forward as represented in the drawing. It will be observed that the arrangement of the bar magnet 54 and its mounting and stops is such that it can rotate in such a direction that it will lie normal in one sense to the plane of flywheel 34 and rotate through a semicircle so that it will lie normal in the other sense to the plane of flywheel 34 but it cannot rotate more than one half of a circle.

For completeness, a source of radiation 62 (which, for a space vehicle, may be the Sun) and an ambient magnetic field representation in the form of an arrow 64 are shown.

Because the art of mounting mechanical parts rigidly with respect to each other is very old and well known and because the optimum structure for a particular purpose will depend largely upon the purpose to be served, mounting members have been omitted from this figure for the sake of clarity. However, in the following discussion it will be understood that the various parts are mounted rigidly and connected to the frame of some freely rotatable vehicle whose orientation this device is to control.

It is evident from consideration of the figure, and is described in more detail in my copending application to which reference has already been made, that solar batteries 16 and 20 and their shades 18 and 22 will cooperate in the following fashion: if a source of visible radiation such as 62 is located in such a direction with respect to the device represented that solar battery 16 and solar battery 20 are equally illuminated, they will both produce (assuming that they are of similar characteristics) equal currents; and, since they are connected in negative-terminal-to-positive-terminal fashion such equal currents will simply circulate between them, and no net flow through conductors 28 and 30. This will imply, in a symmetrical structure such as is represented, that radiation source 62 lies on a normal to a line or axis between batteries 16 and 20. If, however, the structure is rotated "in" the plane of flywheel 12, that is, around an axis normal to the plane of flywheel 12 (for example, around a line parallel to the vertically represented leg of 34 which includes pump 36) then one solar battery (e.g., 16) will be partially or completely shaded by its associated shade (e.g., 18) and will produce less current than its fully illuminated counterpart (e.g., 20). The excess current produced by the counterpart will flow through conductors 28, 30, and 32 to drive pump 14 and excite solenoid 31. Pump 14 is so connected that excess current from solar battery 20 will cause pump 14 to drive fluid in flywheel 12 in such a direction as to absorb from the structure, and store, angular momentum of such sign as to tend to cause the structure to rotate back to a stable position in which solar batteries 16 and 20 are equally illuminated.

Similarly, solar batteries 38 and 42, cooperating with their associated shades 40 and 44, will tend to restore the position of the structure if it is rotated in (i.e., around an axis normal to) the plane of fluid flywheel 34. However, as is pointed out at considerable length in my copending application of reference, it is undesirable to rely exclusively upon flywheels of any kind to control or adjust the orientation of a space vehicle, since there are physical limits to the amount of angular momentum that can be stored by a given flywheel, and it is desirable that flywheels be used simply as temporary angular momentum storage means which are slowly unloaded against some conveniently available force field or source of torque. The solenoid 31 is a device for accomplishing this. The bar magnet 54 is constrained to rotate only in one plane with respect to the structure represented (and thus with respect to a space vehicle in which it may be incorporated). Consequently, if the vehicle is in an ambient magnetic field the torques resulting from the interaction between the bar magnet 54 and the external ambient magnetic field will be such that ultimately the plane in which the bar magnet is free to rotate will include the direction of the ambient magnetic field. Thus, if current is caused to flow through the solenoid 31 producing a magnetic polarization in its core, there will be a torque upon solenoid 31 which will be transmitted to the vehicle which will tend to rotate the vehicle in the plane of the fluid flywheel 12. Since there will be current flowing through the solenoid 31 so long as there is current flowing through the pump 14 there will always be a magnetic torque developed by the solenoid during the time that there is some angular momentum stored in the fluid flywheel, for such angular momentum is stored in the fluid flywheel through continued application of current to the pump 14. Thus it is evident that, by proper polarization of the solenoid 31 with respect to the connections of the pump 14 it will always be possible to arrange that the torque provided through interaction between the solenoid 31 and the ambient magnetic field will be in such a direction as to tend to unload the angular momentum stored in the fluid of fluid flywheel 12. The reason for having stops 60 to limit the rotation of bar magnet 54 to one-half of a circle is to insure that the orientation of the solenoid 31 in the ambient magnetic field will always be in such a direction that its torque will tend to unload the fluid flywheel 12 of its stored angular momentum. For this to occur, current flow in a given direction through the windings of solenoid 31 must always tend to produce torque in the same given sense. However, the nature of magnetic interaction is such that if a given current were flowing through solenoid 31 in such a direction as to cause it to endeavor to rotate, for example, to the observer's right, and then solenoid 31 were reversed in position by 180 degrees with current still flowing through it in the same direction, it would still tend to rotate to the observer's right; but that would constitute a direction of *angular* rotation opposite in sense to that produced in the first instance. The function of bar magnet 54 with its stop is to insure that the solenoid 31 will always be positioned in the proper semicircle of its operative plane to insure that it will serve to unload rather than to increase the angular momentum in its fluid flywheel 12. Bar magnet 54 also, as has been pointed out, insures that the entire device will tend to lie in a particular orientation with respect to the ambient magnetic field.

It does not appear from the description thus far what, if anything, will serve to unload angular momentum stored in flywheel 34. Such unloading is in fact also accomplished by the action of solenoid 31 and its interaction with the external ambient magnetic field. This occurs, however, in a somewhat indirect manner. According to the well known rules of dynamics, and in particular those pertaining to gyroscopes, if flywheel 34 acquires angular momentum its reaction upon the frame of the vehicle (and thus upon fluid flywheel 12) will be such that fluid flywheel 12 will tend to precess; it will turn in such a direction that it will acquire some of the angular momentum stored in fluid flywheel 34. Such acquisition of momentum by precession will cause the spacecraft to be displaced in such a direction that either solar batteries 16 or solar battery 20 will be illuminated more than its mate and thus a current will flow through pump 14 and solenoid 31, the flow through solenoid 31 being in such a direction that the angular momentum in fluid flywheel 12 tends to be unloaded against the ambient magnetic field. Thus whenever it is necessary for the stability of the vehicle that fluid flywheel 34 function to store angular momentum, the very act of such storage will tend to transfer some of the angular momentum to fluid flywheel 12 from which it will be unloaded by the functioning of solenoid 31.

Thus it is evident that I have provided a device in which two fluid flywheels arranged to store angular momentum around two mutually orthogonal axes can be unloaded against an ambient field by a single unloading device which is in fact associated directly only with one of the flywheels.

While a specific embodiment, preferable for usual applications, has been disclosed herein, it should be observed that the basic idea is subject to general expression. Thus, flywheels 12 and 34 are generically controllable angular momentum storage means, and may be so considered with inclusion of pumps 14 and 36; or, alternatively, pumps 14 and 36 may be considered separately as controllable motive means. Similarly, solar batteries 16 and 20 and 38 and 42 may be regarded as radiant energy sensing means; and their shades 18, 22, and 40 and 44 are radiant energy control means. Also, permanent magnet 54 and solenoid 31 are generically force field interacting means; if one should ever have an orientation problem in a region of ambient electric, rather than magnetic, field, electric dipoles could replace the magnetic devices and perform a corresponding function. Also, if the idea were presented and claimed narrowly, it would be easy to appropriate the essence of the idea outside of its presentation and claiming. For example, while it is most convenient to employ two flywheels whose planes are orthogonal to each other, it is feasible to employ flywheels which are in planes oblique to each other and control them so that they provide the same resultant angular momentum as would orthogonal flywheels.

I claim:
1. A device for orienting a freely rotatable structure with respect to a source of radiant energy and an ambient force field, comprising in combination:
    (a) controllable angular momentum storage means for storing angular momentum in a first plane and for storing angular momentum in a second plane orthogonal to the first plane;
    (b) radiant energy sensing means provided with radiant energy control means for sensing rotational displacement of the device in the first plane with respect to a source of radiant energy and for sensing rotational displacement of the device in the second plane with respect to the source of radiant energy; and producing signals representative thereof;
    (c) permanent force field interacting means for interacting with said ambient force field to produce torques tending to align the device so that the said second plane is aligned with the ambient field;
    (d) controllable force field interacting means for interacting with the said ambient force field responsively to signals from the said radiant energy sensing means;
    (e) connecting means connecting the said radiant energy sensing means,
        (1) to the said controllable angular momentum storage means to cause the angular momentum storage means to store angular momentum in the said first plane responsively to signals representative of rotational displacement in the first plane and to cause the angular momentum storage means to store angular momentum in said second plane responsively to signals representative of rotational displacement in the said second plane; and
        (2) to the said controllable force field interacting means to interact with the ambient force field responsively to signals representative of rotational displacement in the said second plane.

2. A device as claimed in claim 1 in which:
    (a) controllable angular momentum storage means comprises two fluid flywheels with magnetohydrodynamic pumps;
    (b) radiant energy sensing means comprises two pairs of solar batteries;
    (c) permanent force field interacting means comprises a permanent magnet pivoted to rotate over a semicircle;
    (d) controllable force field interacting means comprises a solenoid.

3. A device for orienting a freely rotatable structure with respect to a source of radiant energy and an ambient magnetic field comprising in combination:
    (a) a first flywheel for storing angular momentum in a first plane, arranged to be driven by first controllable motive means;
    (b) a second flywheel for storing angular momentum in a second plane orthogonal to the first plane, arranged to be driven by second controllably motive means;
    (c) a solenoid having its axis parallel to the intersection of the first and second planes;
    (d) a first pair of solar batteries,
        (1) provided with radiant energy control means, and so spaced from each other that angular displacement of the device in the said first plane with respect to an external source of radiation will alter the relative illumination of the two batteries of the pair, and
        (2) having their output terminals connected to earh other in polarity opposition and connected to the first controllable motive means to control its operation;
    (e) a second pair of solar batteries,
        (1) provided with radiant energy control means, and so spaced from each other that angular displacement of the device in the said second plane with respect to an external source of radiation will alter the relative illumination of the two batteries of the pair, and
        (2) having their output terminals connected to each other in polarity opposition and connected to the second controllable motive means to control its operation and to the said solenoid;
    (f) a bar magnet mounted by pivot means for rotation in a plane parallel to the said second plane, and stopped to limit its rotation to a quadrant on either side of a line parallel to the intersection of the said first and second planes.

4. A device as claimed in claim 3 in which the said first pair of solar batteries controls the operation of the first controllable motive means by furnishing the driving energy to it.

5. A device as claimed in claim 3 in which the said first and second flywheels are fluid flywheels.

References Cited
UNITED STATES PATENTS 3,307,905    2/1967    Davis et al. _____ 250—203

RALPH G. NILSON, *Primary Examiner.*

M. ABRAMSON, *Assistant Examiner.*